(12) United States Patent
Champion, Jr. et al.

(10) Patent No.: US 6,731,654 B1
(45) Date of Patent: May 4, 2004

(54) COMMUNICATION SYSTEM OVERHEAD CHANNEL

(75) Inventors: James E. Champion, Jr., Orlando, FL (US); Roger A. Babb, Orlando, FL (US); Stephen P. Wint, Orlando, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 0 days.

(21) Appl. No.: 09/300,114

(22) Filed: Apr. 27, 1999

(51) Int. Cl.[7] .................................................. H04J 3/06
(52) U.S. Cl. ...................................................... 370/503
(58) Field of Search ........................ 370/503, 345–353, 370/389–395, 218, 397, 401, 407–414, 466–476, 366, 203, 329, 580, 216, 465, 506, 244, 392; 375/322, 222, 281; 455/522, 504

(56) References Cited

U.S. PATENT DOCUMENTS

| | | | | |
|---|---|---|---|---|
| 5,051,979 A | * | 9/1991 | Chaudhuri et al. | 370/506 |
| 5,265,096 A | * | 11/1993 | Parruck | 370/216 |
| 5,335,223 A | * | 8/1994 | Iino | 370/503 |
| 5,452,306 A | * | 9/1995 | Turudic et al. | 370/465 |
| 5,473,611 A | * | 12/1995 | Gilboa et al. | 370/102 |
| 5,715,248 A | * | 2/1998 | Lagle, III et al. | 370/366 |
| 6,072,777 A | * | 6/2000 | Bencheck et al. | 370/244 |
| 6,314,097 B1 | * | 11/2001 | Ohara | 370/392 |
| 6,317,439 B1 | * | 11/2001 | Cardona et al. | 370/503 |
| 6,373,860 B1 | * | 4/2002 | O'Toole et al. | 370/493 |
| 6,389,036 B1 | * | 5/2002 | Stewart et al. | 370/466 |

* cited by examiner

*Primary Examiner*—Chi Pham
*Assistant Examiner*—Prenell Jones
(74) *Attorney, Agent, or Firm*—Fulbright & Jaworski LLP

(57) ABSTRACT

A system and method for transmitting specialized overhead data in the payload section of a standard communication frame such as a modem frame. The overhead data is added to the user payload data and the combination is presented to a communication interface, such as a modem, as payload-only data for transmission. A similar process at the receiving end extracts the overhead data from the payload data presented by the receiving communication interface. The overhead data can include information that is used to interpret the payload data and to identify which type of communications protocol it represents. The overhead data can also include network management information for use by a communications processor.

18 Claims, 2 Drawing Sheets

COMMUNICATION SYSTEM OVERHEAD CHANNEL

REFERENCE TO RELATED APPLICATIONS

The present application is being concurrently filed with commonly assigned U.S. patent application, Ser. No. 09/300,575 entitled "MANAGEMENT OF RADIO NETWORK THROUGH ETHERNET", the disclosure of which is incorporated herein by reference.

Reference is also made to the following co-pending and commonly assigned U.S. patent application entitled "METHOD AND APPARATUS FOR INTERFACING WITH AN ETHERNET ARCHITECTURE", Ser. No. 09/227,834, filed Jan. 11, 1999, the disclosure of which is incorporated herein by reference.

TECHNICAL FIELD

The invention relates to the transmission of data via radio signals. More specifically, it relates to the provision of an in band radio control channel.

BACKGROUND

In a network of information systems, such as computer systems and telephony devices, any communication between two nodes of the network generally contains two distinct types of data: 1) user data that is intended to go from one node to another, and 2) communications overhead data that is used to facilitate movement of the user data between nodes. Since the communications overhead data is only needed for communication, it is generally created by a sending communication interface device, such as the sender's network interface card (NIC), modem, and/or other device, before transmission and deletion by a receiving communication interface device, such as the receiver's NIC modem and/or other device after reception. Therefore the user computer or other termination device never sees the communications overhead data and may be unaware of its existence. (Note: In the context of this document, the terms 'user computer' and 'user data' do not necessarily imply a human user. They refer to the devices, such as computers at the node which perform the various functions that the node exists to handle, and the data that those devices transfer to each other. The terms are defined in this manner to distinguish between the data transferred between network nodes and the data used only to facilitate the communications process.)

There is another type or layer of data, however, that does not fall within either category, and which can be generically called network overhead data. This can include network management information, which is data that can be used to improve the overall operation of the communications network as provided through the various links comprising the network. Since this data is not native to the individual point-to-point communication, the communication interface devices, such as the aforementioned links and modems, do not comprehend it. But since the data is related to the communications function, it is not user data and typical user software does not comprehend it either. Even if the user computer can be programmed to identify this network information and insert it into or remove it from the user data, the use of very high speed communication links would put a burden on the user computer that most are unable to handle. The use of radio links, with typical speeds of hundreds of megabits per second, renders the user computer completely inadequate for this task. Moreover, in addition to the user typically not wanting to share bandwidth available to the user with communication network data, the communication network provider, or other system administration, does not want the user (or user equipment) to have access to this overhead data.

With conventional systems this additional layer of information, if implemented at all, is typically transmitted separately. This might take the form of a separate network, such as through separate links to link apparatus, through a separate network, such as a public switched telephone network (PSTN) and/or a discrete link, such as in the case of radio where a discrete link frequency channel provides a second link. Either option requires the expense of secondary equipment just to monitor or operate the primary equipment. This additional equipment will also have its own operational and reliability problems, further adding to the cost of maintaining the overall system. It would be preferable to transmit this information over the same link that is used for communicating user data. However, standard communication interface devices do not include this type of information and do not provide a way to incorporate it into the communication overhead data.

Much of the difficulty is caused by the predetermined operation of the communication interface devices, such as a modem. Communications overhead data typically is often used to enable link reliability functions such as error detection and/or correction. These functions are used to detect errors in the bit stream that may have occurred during transmission, and to correct those errors in the received data. Error detection/correction may take various forms, but in general is implemented by using an algorithm to derive additional data from the user data before transmission, transmitting this additional data with the user data, and then repeating the algorithm on the received user data to see if it produces the same result as the received additional data. If the results match, the received user data is assumed to be error-free. If the results do not match, the format of the additional data permits limited correction of user data through reconstruction algorithms.

This error detection/correction function is typically implemented by the communication interface devices such as the above mentioned modems. Accordingly, the additional data is referred to herein as "modem overhead data" as well as communication overhead data. Although it shall be appreciated that similar data or other data useful in providing desired communication, such a routing information, etc., may be provided by other forms of communication interface devices, such as the aforementioned NICs.

Communication interface devices, such as modems, also typically implement "frame" transmission, which may be utilized to facilitate the above mentioned error detection/ correction, dividing the data into continuously transmitted discrete frames of a predetermined size and format. The predetermined frame format allows the receiving communication interface device to know where to look within each frame for modem overhead data and user data. Unfortunately, each type of communications standard (Ethernet, Fast Ethernet, SONET, radio, etc.) has developed different format/ framing standards, and extensive conversion may be needed when data is successively transmitted through different types of communications links if this communication overhead data is to be shared among the successive devices.

Regardless of the communications standard used, each transmission which utilizes the above described overhead data frame can be considered to have two distinct data parts: payload data and modem overhead data. The payload data is the data presented to the communication interface device for transmission. The communication overhead data is the additional data added by the transmitting communication interface device and removed by a receiving communication interface device. User computers typically do not see any communication overhead data and are functionally unaware of its existence. Therefore, the communication of user data through a pair of such communication interface devices appears to the user as a stream of user data, although it may actually be broken up to fit particular framing standards and have communication overhead data appended thereto.

Communication interface devices, such as modems, can also make use of additional techniques to ensure that the frame occurs in a periodic manner such that two communicating devices are always in synchronism with respect to the beginning and end of a modem frame. Because the frame format is known, the devices always know where the location of payload data and communication overhead data, such as error correction data is located relative to the beginning and end of each frame. Some communications standards require that frames be transmitted synchronously and continuously, even if there is no user data to transmit. In those cases, 'empty' or 'null' user data must be substituted during those periods of idleness. Since user data may be presented for transmission at any time, and may be framed differently than the modem requires, techniques are required that both synchronize and reframe the data.

In addition to the above mentioned communication overhead data, information useful in controlling aspects of the network and/or its various links may be desired. For example, where a link is provided through wireless means, the above mentioned communication overhead information may be insufficient to provide desired communication characteristics. Specifically, as radio frequency communications are attenuated due to atmosphere conditions, signal fades and in extreme conditions signal loss may result which simply is not addressable by the communication overhead information such as error correction techniques. Accordingly, a communication system overhead channel, such as a radio overhead channel may be desired which places the radios of a wireless link in communication with one another in order to allow information regarding the need to increase a transmission power level to compensate for a change in received signal characteristics, such as due to a change in atmosphere conditions. As there must exist a link to provide the user data link, it would be preferable that the radio overhead channel or other network link overhead channel be provided through this user data link. However, due to the above mentioned link data structure requirements, such as framing, it is difficult to transport additional overhead data in band without consuming user payload bandwidth.

Additionally, in order for the transmission of the communication interface device to appear transparent to the user, it is desired that its throughput of user data match that of the termination device, irrespective of the addition of overhead data, in order to avoid delays and accumulation of user data at the transmission point. Accordingly, the addition of in band network overhead data becomes further complicated.

Considering the aforementioned problems with conventional systems, it is desirable to provide an economical interface that can transmit and receive network overhead data over the same channel used to communicate payload and communication overhead data, while providing all the necessary synchronization and framing conversions. It is particularly desirable to provide this interface for radio link communications, where such network technology is relatively undeveloped.

SUMMARY OF THE INVENTION

A solution to the aforementioned problems in the prior art is achieved by a system and method which places specialized overhead data into the payload data before presentation of the payload data to a communication interface device, such as a modem. The data is placed in such a manner as to cause each frame to contain the overhead data in the same location and format, i.e., providing a network overhead data frame within a communication interface device frame to enable predictable in band transmission of network overhead data which may be easily multiplexed and demultiplexed from other transmitted data. A multiplexing/demultiplexing device providing a user data interface, a link overhead data interface, and a communication interface device interface, such as a specially adapted network interface card (NIC) can be used to insert/extract this overhead data into/from the payload so that the communication interface devices see it as payload data, while the associated user computers do not. This overhead data might be generated by a network controller such as a centralized network operations center and/or a distributed network controller associated with a particular link or subset of links of a network. Additionally, or alternatively, this overhead data may be generated by the multiplexer/developer device, or control logic operable therewith, or the user computer possibly in response to a monitored attribute such as a measured bit error rate in the received user data or a triggering event such as a particular number of requests to resend a particular data packet. In a preferred embodiment, the network uses radio links for communication and this overhead information is referred to as radio overhead data.

It is an object of the invention to provide an interface that will embed or multiplex special overhead data into the payload data of a communication interface device transmission stream, such as a modem frame. Accordingly, it is an object of a preferred embodiment of the invention to provide an interface that will embed radio overhead data into the payload data of a radio modem frame.

It is a further object of the invention to provide an interface that will extract the special overhead data from the payload data of a communication interface device received data stream, such as a modem frame. Accordingly, it is an object of a preferred embodiment of the invention to provide an interface that will extract radio overhead data from the payload data of a radio modem frame.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The invention incorporates a specialized device and method that can perform the required conversions to convey management overhead such as network link data in band such as in the payload section of a modem frame. A preferred embodiment places the invention on a communication interface such as a network interface card. By intercepting the data flowing between a communication interface, such as a modem, and user or termination equipment, such as a computer or telephone device, or intermediate communication device disposed there between, such as an Ethernet switch or SONET network element, the invention can append the network overhead data to the user data and pass this new, larger volume of data to the communication interface for transmission. When data is received by a corresponding communication interface, the reverse process can be used to remove this overhead data before passing the original user data on to the receiving termination equipment. To simplify the removal process, a preferred embodiment places a network link overhead data block into each communication frame.

Figure 1:
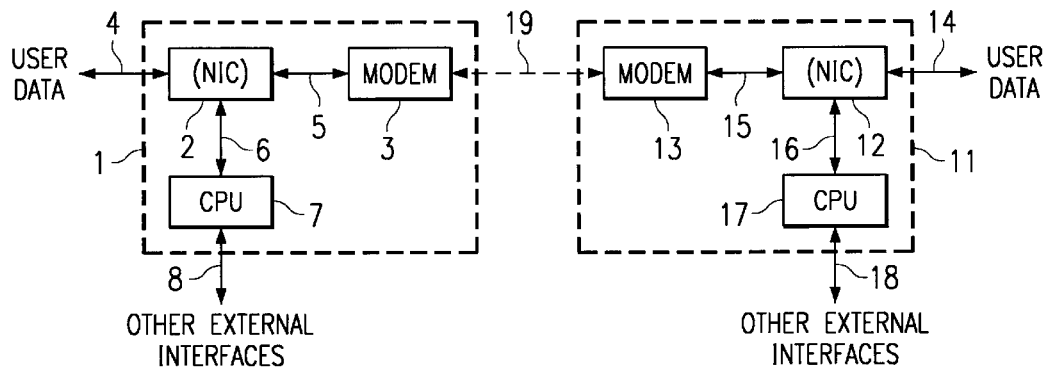
FIG. 1 shows a block diagram of network interfaces at each end of a communications link.

FIG. 1 shows a block diagram of a portion of a system using a preferred embodiment of the invention. Network interface 1 represents the devices at one network node which communicates over communications link 19 to network interface 11 of a different node. In a preferred embodiment, network interfaces 1 and 11 can be identical except for programming or circuitry differences to distinguish between the different addresses. As shown, user payload data from a user computer or other device (not shown) can be transferred over interface 4 to network interface card (NIC) 2 for transmission. NIC 2 can modify the payload data as required before passing it on to modem 3 for transmission. CPU 7 can provide for control of NIC 2 through interface 6 by programming NIC 2, passing data to NIC 2 to be incorporated into the transmission, and/or handling other NIC monitoring and control functions. CPU 7 can be a communications processor that is separate from the aforementioned user computer or other device. In a preferred embodiment, CPU 7 is co-located with NIC 2 and modem 3. Alternatively, the functionality of CPU 7 may be provided by an external device, such as user equipment, including that which is in communication via the link.

Once NIC 2 passes payload data (either modified or unmodified) on to the communication interface devices utilized for communication over link 19, here modem 3, modem 3 can append modem overhead data to the payload data, form this collective data into a frame, and transmit the frame over link 19 to modem 13. In a preferred embodiment, both modems 3 and 13 use conventional error detection/correction and framing techniques. Once modem 13 receives the transmitted frame from modem 3, it can strip away the modem overhead data and pass the remaining payload data on to NIC 12. NIC 12 can examine the received payload, separate, thereby recreating, the original user payload data from any modifications, e.g., added network overhead data, made by NIC 2, and make independent decisions on what to do with the recreated user payload data and the recreated modifications, e.g., recreated network overhead data. Depending on the contents of the received data and the programming of NIC 12, NIC 12 may discard data, pass data (e.g., recreated user payload data) on to the user computer over link 14, or pass data (e.g., recreated network overhead data) on to communications processor 17.

Communications processors 7 and 17 can each have additional interfaces (8, 18) that allow network interfaces 1 and 11 to communicate with other devices as required. In a preferred embodiment, every interface and communications link (4, 5, 6, 8, 14, 15, 16, 18 and 19) can be bidirectional as shown, permitting each network interface 1 and 11 to operate as both a transmitter and a receiver. Communications link 19 is preferably a point-to-point radio link.

Figure 2:
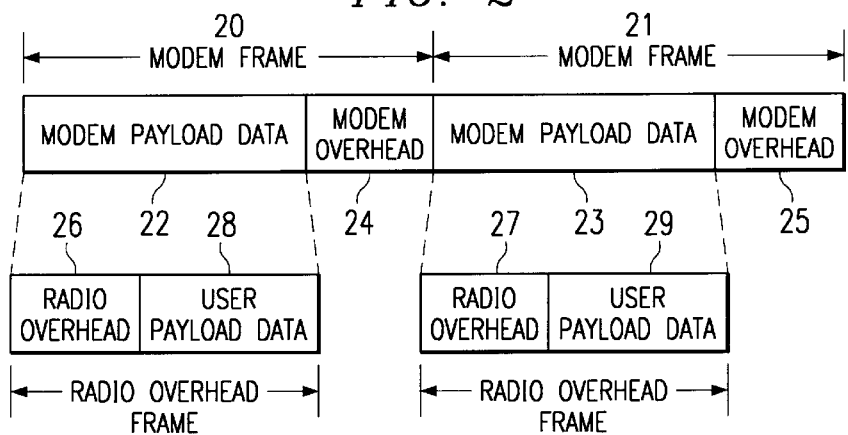
FIG. 2 shows radio modem frames and the modified contents of the payload section.

FIG. 2 shows conventional modem frames 20 and 21 being transmitted in immediate succession. Each frame has the same structure, being composed of modem payload data 22 or 23 and modem overhead 24 or 25. Modem payload data is the data presented to a modem for transmission, while modem overhead data represents the additional data generated by the transmitting modem to facilitate the successful transmission of the particular frame. Modem overhead generally consists of forward error correction (FEC) data, but may have other communication-related data as well, depending on the particular modems used. The receiving modem uses FEC data to check the validity of the modem payload data, to correct any errors thus detected, and then discards the FEC data before passing the payload data on to the user computer. Since the user computers do not see the modem overhead data, conventional user software does not make provisions for it, and is unaware of its existence.

The lower part of FIG. 2 shows how modem payload data 22 or 23 can be modified by the present invention. For simplicity, only the first frame 20 is described, but the same description applies to frame 21 and any subsequent frames. Rather than let the modem payload data consist entirely of user payload data 28, the invention can insert additional overhead data into the payload data stream. In a preferred embodiment, this additional overhead data can be radio overhead data 26 (as labeled in FIG. 2) because it can consist of network management data used to manage a network of radio links. However, this additional overhead data can also contain any other data that is not exclusively destined for the user equipment.

Since the size of modem payload data 22 is generally fixed by the modem, the amount of user payload data 28 that can placed into modem payload data 22 is reduced by the presence of radio overhead data 26. In a preferred embodiment, the sizes of modem payload data 22, radio overhead data 26, and user payload data 28 are all predetermined and consistent from frame to frame. Of course, where the modem frame is adjustable, so too may the radio overhead data of the preferred embodiment be adjusted, if desired.

For the receiving NIC to know which data is radio overhead 26 and which is user payload 28, the receiving NIC preferably knows where within modem payload data frame 22 to find each type of data. In a preferred embodiment, the first portion of the frame is radio overhead 26 of a predetermined length and format, and the remainder of the frame is user payload 28, also of a predetermined length and format.

For transmission purposes, the NIC is informed when a new frame is about to be transmitted by the modem so that it can insert radio overhead data into the data stream provided to the modem and thereby interface this overhead data into initial part of modem payload data 22 of each frame. Of course, other placements of this overhead data are possible, including its placement at the end of the modem payload data and even interleaved into the modem payload data, as desired.

In a preferred embodiment, the start of a new frame is indicated by a separate signal from the modem to the NIC at the start of each frame, thus allowing the NIC to synchronize its operation with the modem frames. In a preferred embodiment, this signal can be a voltage change or pulse on a signal line.

The user payload data which is to be transmitted generally comes from another communications interface with different formatting and framing requirements. Two common examples are Ethernet for a local area network (LAN) or wide area network (WAN), and Synchronous Optical Network (SONET) for an optical fiber network. Converting between the requirements of these and other such networks and the requirements of a radio modem can be accomplished as part of the invention.

Preferred embodiments of the present invention adapted to provide a network and overhead channel in band with Ethernet data packets or SONET data packets are described below. However, it shall be appreciated that the present invention is useful with any number of different network data packet protocols. For example, one of skill in the art will readily appreciate that many asynchronous data packet protocols may be adapted according to the concepts described below with respect to the provision of network overhead with Ethernet data packets. Likewise, one of skill in the art will also readily appreciate that many synchronous data packet protocols may be adapted according to the concepts described below with respect to the provision of network overhead with SONET data packets.

Ethernet Data

Figure 3:
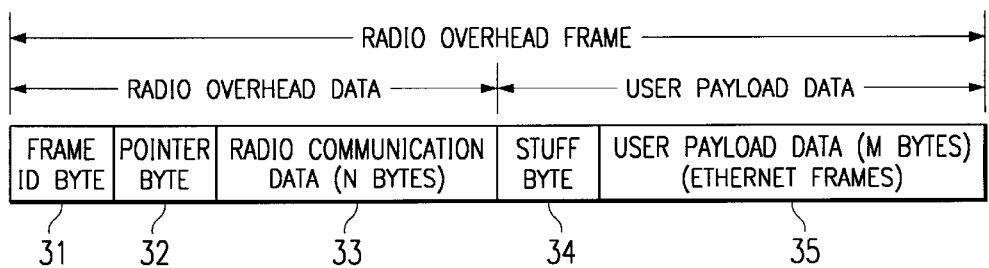
FIG. 3 shows the detailed contents of a radio overhead frame for transmitting Ethernet-formatted data.

FIG. 3 shows the format of both radio overhead data and user payload data when the data for transmission is provided in an Ethernet, such as Fast Ethernet, or other asynchronous format. The Ethernet format is radically different than the preferred embodiment radio format. Ethernet frames can be of variable length and are transmitted at irregular intervals with unpredictable time delays between frames. By contrast, the preferred embodiment radio frames are of fixed length, and are transmitted continuously and synchronously at regular intervals with no delay between frames.

It should be appreciated that Fast Ethernet formatted data (100BaseFX per IEEE 802.3u) is generally referred to as having a bit rate of 100 Mbps. However, at the Fast Ethernet physical interface between two Fast Ethernet devices the data is transmitted at 125 Mbps on the physical media. The higher line rate is a consequence of an additional level of encoding and decoding that takes place in the physical layer interface devices of Fast Ethernet nodes. The purpose of the encoding, or adding of additional bits of information, serves a number of purposes and are defined in the IEEE 802.3u specification. The method of encoding is referred to as 4B/5B encoding. In essence, for every 4 bits of the Ethernet bitstream an extra bit is added to the data stream. The extra bit allows for unique codewords, 5 bits in length, to be sent across the Fast Ethernet link for the purpose of signaling a receiving physical layer device where the beginning and end of the Fast Ethernet frames are located within the bit stream. A 5-bit codeword could therefore represent a signal, or flag that marks the beginning of an Ethernet frame for example, or it could be Ethernet data. Thus in general, the encoding facilitates the communication of framing and other information from a transmitting Ethernet device to a receiving Ethernet device. The receiving device examines each 5-bit codeword and interprets the data as either Ethernet data or signaling information. While there are other methods for accomplishing the same task, this is the method specified in the Fast Ethernet specification, IEEE 802.3u. The framing information is utilized because the Ethernet frames are asynchronous in nature but the physical media devices requires a constant data stream in order to maintain lock of the clock recovery devices. Therefore, some of the unique codewords generated by the addition of the extra "$5^{th}$ bit" could be a null or idle sequence.

When transmitting Ethernet data by radios it is also desirable to be able to communicate framing information to a receiving radio so that the beginning and end of Ethernet frames can be known. In addition, a radio link also preferably continuously transmits and receives data in order to keep the modems synchronized. Conceptually this same method of encoding could be employed in the radios; however, the 4B/5B encoding method results in a significant increase in the amount of transmitted data. Specifically, 100 Mbps of data is increased 25% to 125 Mbps by the use of 4B/5B encoding. With the addition of radio overhead data, the total data rate that the modem would be required to handle becomes undesirable in a preferred embodiment. Therefore, the preferred embodiment of the present invention creates a more efficient technique of communicating the Ethernet framing information from a transmitting radio to a receiving radio than is used in traditional Fast Ethernet media such as fiber optic cable. According to this technique, user data, such as the aforementioned 100 Mbps user data (without the 4B/5B encoding to result in 125 Mbps) is packaged in radio frames of fixed length which are transmitted continuously and synchronously at regular intervals.

An Ethernet frame which is larger than the user payload section of FIG. 2 can be broken into smaller segments that are no larger than the prescribed user payload space within a frame. When the Ethernet frames are significantly smaller than the user payload space, multiple Ethernet frames might fit within the user payload of a single radio frame.

Considering these variables, the beginning/ending boundaries of an Ethernet frame may not correspond to the boundaries of the user payload data in a radio frame. However, radio overhead data of FIG. 3 can be used to assist in implementing the necessary conversions. Frame ID byte 31 can be a signaling byte with bit fields which identify specific characteristics about the radio overhead data, stuff byte (described below), and Ethernet payload data. For instance, these bit fields can indicate whether the incoming data was formatted for a particular format, such as Ethernet or SONET, whether a stuff byte is included in the payload section, and how to interpret the remaining radio overhead bytes. Pointer byte 32 can be an optional 8-bit pointer whose value represents the offset of the start of an Ethernet frame within the user payload data field. Since one Ethernet frame can end and another start in the middle of a radio frame, pointer byte 32 can identify the existence and location of this transition. Radio comm data 33 can be the network management data, such as utilized in improving overall operation of the communication network, that is a primary focus of this invention. Radio comm data 33 is preferably passed to CPU 17 rather than to the user equipment, because it pertains to network management rather than user applications. However, depending on the contents, CPU 17 might pass this data on to the user equipment, such as a user computer providing the functionality of CPU 7 or a system monitoring, maintaining, or controlling the network or various portions thereof Radio comm data 33 can be programmed to be a predetermined number (N) of bits in length. In a preferred embodiment, N is determined by the fixed length of modem payload data 22.

Stuff byte 34 can be an optional 'empty' byte (no meaningful data) that is inserted to compensate for differences or drifts in the user payload data rate. The inevitable slight differences in various data clocks can cause slight mismatches to accumulate during the continuous transmissions of the modem. Stuff byte 34 can be periodically inserted as needed to restore the appropriate synchronization. Frame ID byte 31 can indicate the presence or absence of a stuff byte so that the receiving NIC will know whether to ignore the first user payload byte. Since stuff bytes can be inserted but not deleted (you can't remove a byte that isn't initially there), the modem rate is preferably deliberately set to be slightly higher than the data rate so that any deviation from the theoretical clock speeds can be accommodated by insertion of a stuff byte. In a preferred embodiment, a stuff byte is inserted anytime the accumulated clock errors reach or approach the time needed to transmit a full byte, so that no more than one stuff byte need be inserted in any single modem frame.

The remainder of user payload data 35 can be the Ethernet data that is being transmitted, and is typically passed to the user computer or other device for further processing. Whenever multiple small Ethernet frames are placed within a single user payload data 35, a separate indicator called the Next Frame Flag (NFF) can be used to indicate the condition. The NFF is a byte that may be located in the 12$^{th}$ byte of the interpacket gap (IGP) of an Ethernet frame. This positioning is preferred as the preferred embodiment Ethernet protocol dictates at least a 12 byte gap be present between Ethernet packets. Accordingly the transmission of such successive Ethernet packets may be accomplished according to the present invention by leaving the required 12 byte interpacket gap and placing a NFF byte in this 12$^{th}$, otherwise unused byte, to indicate the multiple Ethernet frame condition. This byte is not shown in FIG. 3, but can be located in the user payload data area 35. The NFF byte preferably indicates an offset at which the next frame begins (i.e., accounts for the variable number of interpacket gap bytes). However, this NFF byte may simply indicate that a second frame is present without indicating any offset information, such as where buffering of the transmitted data is utilized to remove bytes in the interpacket gap in excess of the 12 common to the Ethernet protocol. Of course, it should be appreciated that the placement of the NFF byte may be different from that described above.

SONET Data

Figure 4:
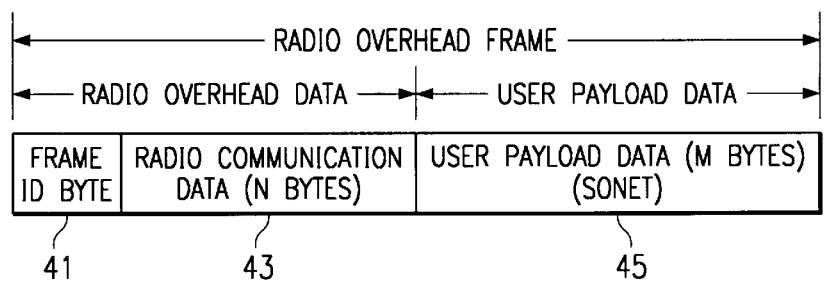
FIG. 4 shows the detailed contents of a radio overhead frame for transmitting SONET data.

FIG. 4 shows the format used when SONET or other synchronous data is to be transmitted over the radio link. SONET data is synchronous and continuous. When no useful data is being transmitted, such as when no SONET network element is connected, i.e., during testing, the void is simply filled in with empty bytes. Frame ID byte 41 can indicate the existence of SONET data. Preferably, since SONET utilizes a precisely clocked data stream, no stuff byte is used for SONET data and therefore, frame ID byte 41 need not indicate the presence or absence of one. Likewise, there is preferably no pointer byte, since the continuous nature of SONET data precludes the need to adjust start and stop boundaries. Radio comm data 43 is similar in purpose to radio comm data 33, in that it can represent the communications overhead data that is a primary object of the invention. User payload data 45 can be the user data being transmitted between user equipment. Conventional SONET frames can be larger than the user payload data 45, and SONET frames are transmitted continuously, making the SONET data appear as a continuous stream of data. The SONET data can be segmented to fit within the bytes allocated to user payload data 45.

Bit Rate Adjustments

Figure 5A:
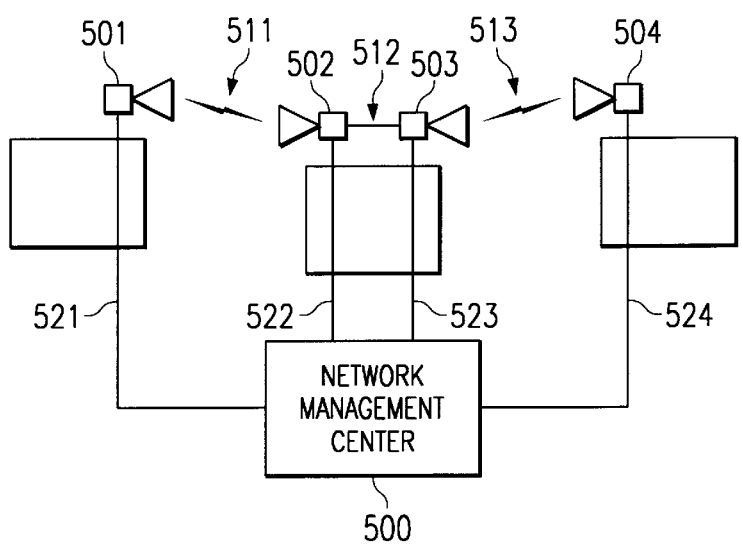
FIGS. 5A and 5B show network configurations utilizing control channel information.
Figure 5B:
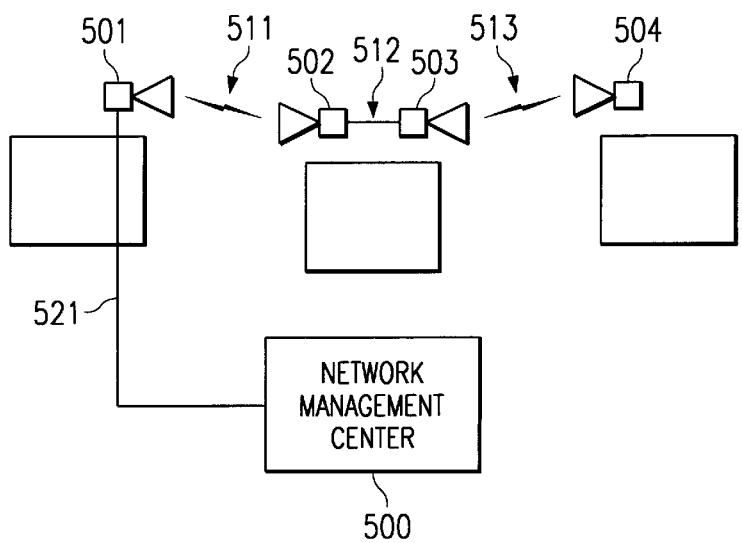

In the creation of a radio overhead frame, additional data is added to the user payload data stream prior to the modem function. At the receiving end of a radio link the user payload data is preferably presented back to the interconnecting network at its original bit-rate. Since more data is communicated over the radio link than is received from or provided to the user computers or other devices, the link preferably communicates the data faster than it otherwise would. Directing attention to FIGS. 5A and 5B, the use of bit rate adjustment of a preferred embodiment is illustrated. As shown in FIG. 5A, wherein a physical network separate from the user data network is provided for control information, user data is passed between communication units (shown as radio units) 501, 502, 503, and 504 through wireless links 511 and 513 and wired link 512. However, control information is passed between communication units 501, 502, 503 and 504 and network management center 500 through links 521, 522, 523 and 524. Because the links associated with user data transmission are not utilized to carry management data, the users are likely to see no degradation associated with the transmission of control information and, therefore, bit rate adjustment of these links is not advantageous in transmitting control information. However, where the user data network also carries the control information, such as shown in FIG. 5B, i.e., radio overhead channel network messages from all radios are provided to network management center 500 through communication unit 501 and link 521, bit rate adjustment with respect to links carrying both user and control data, such as links 511 and 513, is desirable in providing undegraded service to users. To avoid data overruns, the radio overhead frame bit-rate is preferably increased in proportion to the amount of radio overhead added. The transmitting NIC can perform a bit-rate increase in the correct proportion, while the receiving NIC can perform a corresponding bit-rate decrease.

Although the use of the network overhead data of the present invention has been described herein with reference to its use in controlling a link with which its generation is associated, it shall be appreciated that no such limitation is intended. For example, network overhead data may be generated at a particular link point which is directed not to a device at the other end of that particular link, but to a device elsewhere in a communications network. Such a network overhead message may be useful in requesting that another link element adjust a transmission power level downward in order to avoid interference in the link associated with the link element generating the message. Likewise, such message may be useful where centralized network link control is provided for, thus allowing a single control point of presence to control a plurality of link elements throughout the network. Of course, such transmission of overhead data requires a technique for directing the messages to particular link elements. In a preferred embodiment, the network link overhead data includes intended recipient information, such as within the radio comm data portion of the overhead data, such as a physical or logical address associated with an intended recipient link element. Accordingly, the overhead data may be multiplexed by a generating link element and demultiplexed by an associated link element disposed at the opposite end of the link. If the intended recipient information is other than this link element, the overhead data may be directed to a second link for transmission, such as through multiplexing with user data, through a second link and ultimately to the intended recipient link element.

The foregoing description is intended to be illustrative and not limiting. Other variations will be obvious to those of skill in the art. These variations are intended to be encompassed by the invention, which is limited only by the scope of the appended claims.

What is claimed is:

1. A method of communicating overhead data in the payload data of a predefined communication frame, comprising the steps of:

combining first overhead data with user payload data to form communication payload data, wherein the step of combining includes the step of combining radio overhead data with data formatted for Ethernet frames;

sending the communication payload data to a communication interface;

transmitting the communication payload data and communication interface overhead data in a predefined communication frame;

receiving the transmitted-predefined communication frame;

re-creating the communication payload data by removing the communication interface overhead data from the received predefined communication frame;

operating on the re-created communication payload data to re-create the first overhead data and the user payload data; and sending at least a portion of the re-created first overhead data to a communications processor.

2. The method of claim 1, wherein the step of transmitting includes transmitting by radio modem and the step of receiving includes receiving by radio modem.

3. The method of claim 1, wherein the step of sending includes the step of synchronizing the start of the communication payload data with a synchronizing signal from the communication interface.

4. The method of claim 1, wherein the step of operating includes using a frame identification byte to interpret the re-created user payload data.

5. The method of claim 1, wherein the step of operating includes using a frame identification byte to interpret other data in the re-created first overhead data.

6. The method of claim 1, wherein the step of operating includes using a pointer byte to locate the start of an Ethernet frame within the re-created user payload data.

7. The method of claim 1, wherein:

the step of combining includes inserting a stuff byte into the user payload data; and the step of operating includes removing a stuff byte from the user payload data.

8. The method of claim 1, wherein the step of combining includes the step of combining radio overhead data with data formatted for SONET frames.

9. The method of claim 8, wherein the step of operating includes using a frame identification byte to interpret the re-created user payload data.

10. The method of claim 8, wherein the step of operating includes using a frame identification byte to interpret other data in the re-created first overhead data.

11. A system for communicating overhead data in the payload data of a modem frame, comprising a network interface system including:

a modem payload data input; and a modem payload separator including:

a data separator for separating user payload data and overhead data from a predefined modem payload data format;

a user payload data output coupled to the data separator; and an overhead data output coupled to the data separator.

12. The system of claim 11 further comprising:

a radio modem for providing data to said modem payload data input.

13. The system of claim 12 wherein said data separator is operable to process a signal from said radio modem that indicates communication of a start of a modem frame that includes said user payload data and said overhead data.

14. The system of claim 11 wherein said overhead data includes data indicating at least one characteristic of said payload data.

15. The system of claim 14 wherein said data indicating at least one characteristic of payload data indicates that said payload data is Ethernet formatted data.

16. The system of claim 15 wherein said data indicating at least one characteristic of said payload data indicates an offset of an Ethernet frame associated with said payload data.

17. The system of claim 15 wherein said payload data includes a next frame flag that indicates a beginning of another Ethernet frame.

18. The system of claim 14 wherein said data indicating at least one characteristic of payload data indicates that said payload data is SONET formatted data.

* * * * *